(12) United States Patent
Lucas et al.

(10) Patent No.: US 7,032,882 B2
(45) Date of Patent: Apr. 25, 2006

(54) VALVE ASSEMBLY HAVING NOVEL FLOW CHARACTERISTICS

(75) Inventors: Paul D. Lucas, Melrose, MA (US); Anthony J. Carbone, Methuen, MA (US)

(73) Assignee: MKS Instruments, Inc., Andover, MA (US)

( * ) Notice: Subject to any disclaimer, the term of this patent is extended or adjusted under 35 U.S.C. 154(b) by 0 days.

(21) Appl. No.: 10/673,989

(22) Filed: Sep. 29, 2003

(65) Prior Publication Data

US 2005/0067603 A1    Mar. 31, 2005

(51) Int. Cl.
*F16K 1/20* (2006.01)

(52) U.S. Cl. .................. 251/302; 251/364; 277/460; 277/465

(58) Field of Classification Search ............... 251/364, 251/301, 302, 326, 328, 173; 277/641, 644, 277/649, 514, 459, 460, 464, 465
See application file for complete search history.

(56) References Cited

U.S. PATENT DOCUMENTS

| | | | | |
|---|---|---|---|---|
| 2,370,751 A | * | 3/1945 | Prager | 251/159 |
| 2,952,437 A | * | 9/1960 | Knox | 251/302 |
| 2,954,264 A | * | 9/1960 | Tisch et al. | 277/630 |
| 3,307,826 A | * | 3/1967 | Lowrey | 251/328 |
| 3,401,915 A | * | 9/1968 | Kim | 251/364 |
| 4,432,387 A | * | 2/1984 | Sims | 251/302 |
| 4,681,326 A | * | 7/1987 | Kubo | 277/447 |
| 4,765,361 A | * | 8/1988 | Clifford | 251/328 |
| 4,846,442 A | * | 7/1989 | Clarkson et al. | 251/364 |
| 5,577,707 A | | 11/1996 | Brida | |
| 5,836,570 A | * | 11/1998 | Blenkush et al. | 251/328 |
| 6,089,537 A | | 7/2000 | Olmsted | |
| 6,161,576 A | | 12/2000 | Maher et al. | |
| 6,328,051 B1 | | 12/2001 | Maher | |
| 6,409,149 B1 | * | 6/2002 | Maher, Jr. | 251/301 |

OTHER PUBLICATIONS

International Search Report PCT/US2004/025888.

* cited by examiner

*Primary Examiner*—John Bastianelli
(74) *Attorney, Agent, or Firm*—McDermott Will & Emery LLP

(57) ABSTRACT

A valve assembly including a housing having a flow channel and an annular surface surrounding the flow channel, a slide plate movable to a closed position, and a seal ring positioned between the annular surface and the slide plate. The seal ring includes a first and second sides, a first surface extending between the first and the second sides and facing towards the annular surface of the housing, and a second surface axially spaced from the first surface and extending between the first and the second sides and facing towards the slide plate. The second surface includes a continuous annular sealing portion for contacting the slide plate when the seal ring is biased against the slide plate so that a fluid-tight seal can be formed between the continuous annular sealing portion and the slide plate, and at least one passageway positioned between the annular sealing portion and the second side.

22 Claims, 7 Drawing Sheets

FIG. 2
(Prior Art)
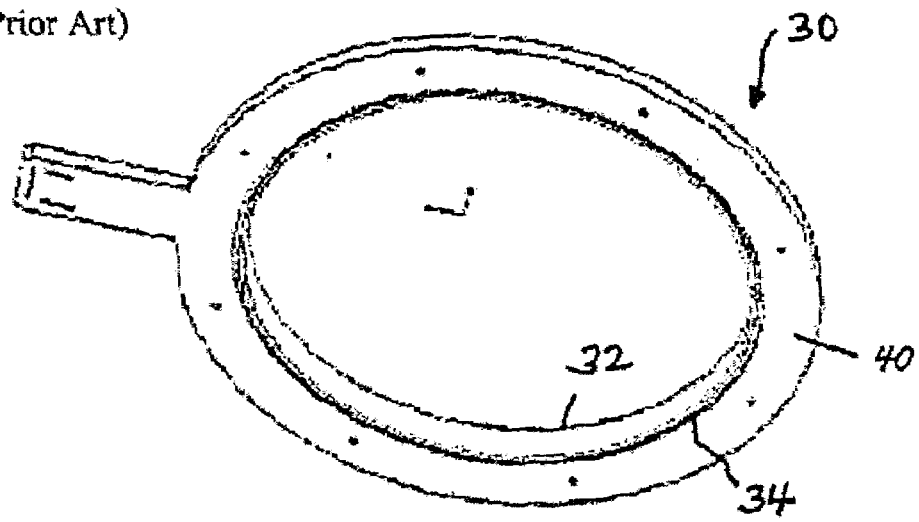
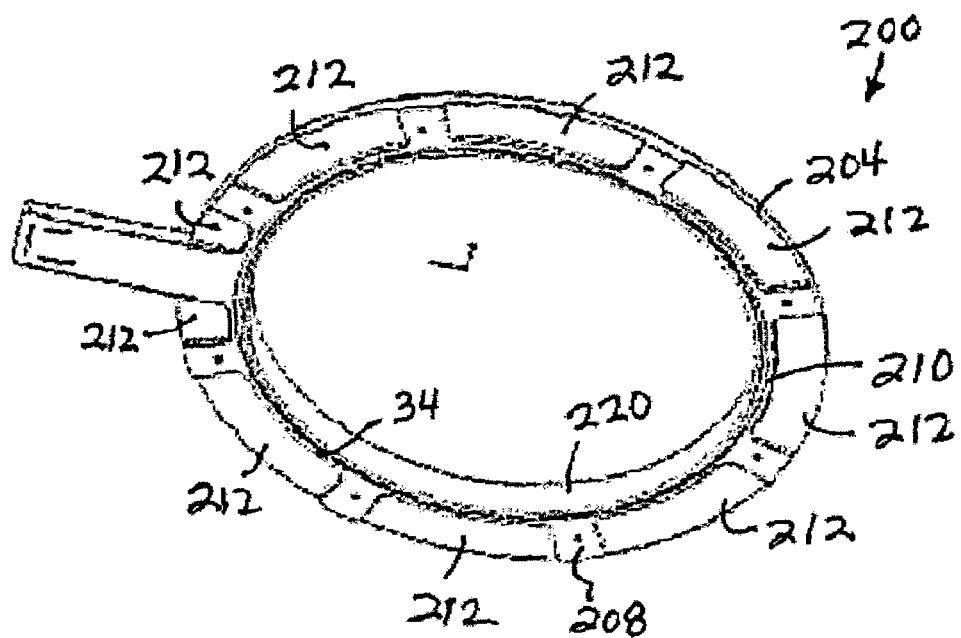
FIG. 8

Axial
Conductance
(L/s)

Axial Gap (Inches)

Axial
Conductance
(L/s)

Axial Gap (Inches)

VALVE ASSEMBLY HAVING NOVEL FLOW CHARACTERISTICS

FIELD OF THE INVENTION

The present invention relates generally to valve assemblies and, more particularly, to a new and improved valve assembly including passageways that provide improved conductance control.

BACKGROUND OF THE INVENTION

A slide or gate valve assembly generally includes a housing defining a flow path extending between an inlet and an outlet. The slide valve assembly can, for example, be connected between a process chamber and a vacuum pump to form a portion of a high purity gas delivery system, such as those used in semiconductor manufacturing or other thin film coating processes performed at very low pressures (high vacuums), e.g., a pressure on the order of one torr or less. In such a case, a flange of the inlet of the valve assembly is secured to the process chamber while a flange of the outlet of the valve assembly is secured to the vacuum pump.

The slide valve assembly includes a slide plate that laterally moves, with respect to an axis of the valve assembly, between open and closed positions. In a pendulum-type slide valve assembly, slide plate is connected to a rotatably shaft by a pivot arm. In a completely opened position the slide plate is moved out of the flow path of the housing so that fluid can freely enter and exit the flow path, while in a closed position the slide plate is moved into close contact with a valve seat or annular surface surrounding the outlet of the valve assembly, so that conductance through the flow path is limited.

In a pendulum valve assembly, the movement of the slide plate usually requires rotational (i.e., pivotal or lateral) movement between the completely opened position and an intermediate position, and then at least some longitudinal (i.e., translational, linear or axial) movement from the intermediate position to the position where the slide plate is in close contact with the valve seat of the outlet. In order to obtain this combination of rotational and translational movement, some prior pendulum valves have typically used multiple actuator elements. The pendulum valve assembly helps control the flow of gas between the process chamber and the vacuum pump by controlling the position of the slide plate between the first opened position out of the flow path, the second opened position inside the flow path, and the minimum controllable conductance position against the valve seat.

Some existing pendulum valves utilize a seal ring to provide a complete seal (isolation) when the seal ring is independently actuated against the slide plate. A complete seal is useful, for example, during cleaning of the process chamber, and normally occurs only between semiconductor processing operations. U.S. Pat. No. 5,577,707 to Brida, for example, which is assigned to VAT Holding AG, discloses a pendulum-type slide valve including a housing having a flow channel, a slide plate for controlling flow through the channel, and a seal ring surrounding the flow channel. The seal ring is movable towards and away from the slide plate, when the slide plate is pivoted to a closed position. The seal ring is biased, using a spring or compressed air, against the slide plate when the latter is in its closed position, to tightly close the slide plate against the valve seat and to form a seal between the slide plate and the seal ring. The seal ring typically provides an isolation function for the valve assembly and is not used to control conductance. Normally the seal ring is held stationary and the slide plate is moved to control conductance.

It should be noted that the distance between the process chamber and the vacuum pump is preferably made as small as possible for various reasons, e.g., in order to conserve processing equipment manufacturing space and to maximize conductance between the process chamber and the vacuum pump. Accordingly, pendulum valve assemblies and other types of slide or gate valves are provided with a smallest possible dimension between outer flanges of the inlet and the outlet (i.e., "flange-to-flange dimension").

One drawback for some existing gate or pendulum valves is that the valve provides poor control of flow (conductance) during the initial opening of the valve. For example, as the gate starts to clear the opening of the valve housing, the conductance increases rapidly. Since there is commonly an overlap between the gate and the opening (i.e., the gate has a larger diameter than the opening), initial movement of the gate results in little if any change in conductance. Thus, the overall conductance includes very little change in conductance followed by a very rapid change in conductance (and vice versa as the gate is closed), which results in poor control of conductance in this operating range of the valve.

One existing pendulum valve utilizes a rotating cam mechanism to improve conductance control. U.S. Pat. No. 6,089,537 to Olmsted, which is assigned to the assignee of the present invention and incorporated herein by reference, discloses an improved pendulum valve assembly that uses a simple rotating cam mechanism that precisely controls the rotational and longitudinal movement of the slide plate between a completely opened position and a completely closed position. The valve beneficially provides fine conductance control near the closed position. U.S. Pat. Nos. 6,161,576, 6,328,051 and 6,409,149, which are all assigned to the assignee of the present invention and incorporated herein by reference, also disclose improved pendulum valve assemblies and systems.

What is further desired, however, is a pendulum valve assembly that provides improved conductance without requiring an increase in the flange-to-flange dimension of the valve assembly.

SUMMARY OF THE INVENTION

The present invention provides a new and improved valve assembly that provides improved conductance without requiring an increase in the flange-to-flange dimension of the valve assembly. The new and improved valve assembly includes a housing having a flow channel and an annular surface surrounding the flow channel, a slide plate located in the housing and movable transversely to an axis of the flow channel between a closed position, in which the slide plate blocks flow through the flow channel, and an opened position, in which the slide plate allows flow through the flow channel, and a seal ring positioned between the annular surface of the housing and the slide plate. The seal ring includes a first side extending generally parallel with the axis of the flow path, a second side spaced radially outwardly from the first side and extending generally parallel with the axis of the flow path, a first surface extending between the first and the second sides and facing towards the annular surface of the housing, and a second surface axially spaced from the first surface and extending between the first and the second sides and facing towards the slide plate.

According to one exemplary embodiment, the second surface of the seal ring includes a continuous annular sealing portion for contacting the slide plate when the seal ring is biased against the slide plate so that a fluid-tight seal can be formed between the continuous annular sealing portion and the slide plate, and at least one passageway positioned between the annular sealing portion and the second side for increasing conductance between the seal ring and the slide plate during movement of the slide plate with respect to the seal ring.

Among other aspects and advantages, the valve assembly of the present invention provides a pendulum valve assembly that includes passageways for providing additional conductance control near the minimum controllable conductance position of the slide plate. In particular, the passageways are provided in the seal ring to provide improved conductance control when the slide plate is moved towards the seal ring upon the valve being opened. The passageways beneficially provide the improved conductance without requiring an increase in the flange-to-flange dimension of the valve assembly.

According to another exemplary embodiment, a surface of the slide plate facing the seal ring includes a continuous annular sealing portion for contacting the seal ring when the seal ring is biased against the slide plate so that a fluid-tight seal can be formed between the continuous annular sealing portion and the seal ring, and at least one passageway positioned between the annular sealing portion and a radially outer side of the slide plate for increasing conductance between the seal ring and the slide plate during movement of the slide plate with respect to the seal ring.

According to a further exemplary embodiment, the valve assembly is provided without the seal ring and one of the slide plate and the annular surface of the housing includes at least one passageway for increasing conductance between the slide plate and the annular surface during movement of the slide plate.

Additional aspects and advantages of the present invention will become readily apparent to those skilled in this art from the following detailed description, wherein exemplary embodiments of the present invention are shown and described, simply by way of illustration of the best modes contemplated for carrying out the present invention. As will be realized, the present invention is capable of other and different embodiments and its several details are capable of modifications in various obvious respects, all without departing from the invention. Accordingly, the drawings and description are to be regarded as illustrative in nature, and not as restrictive.

BRIEF DESCRIPTION OF THE DRAWINGS

Reference is made to the attached drawings, wherein elements having the same reference character designations represent like elements throughout, and wherein:

FIG. 2 is an enlarged bottom perspective view of the seal ring of the pendulum valve assembly of FIG. 1;

FIG. 8 is an enlarged bottom perspective view of the seal ring of the pendulum valve assembly of FIG. 7;

DETAILED DESCRIPTION OF EXEMPLARY EMBODIMENTS

Figure 1:
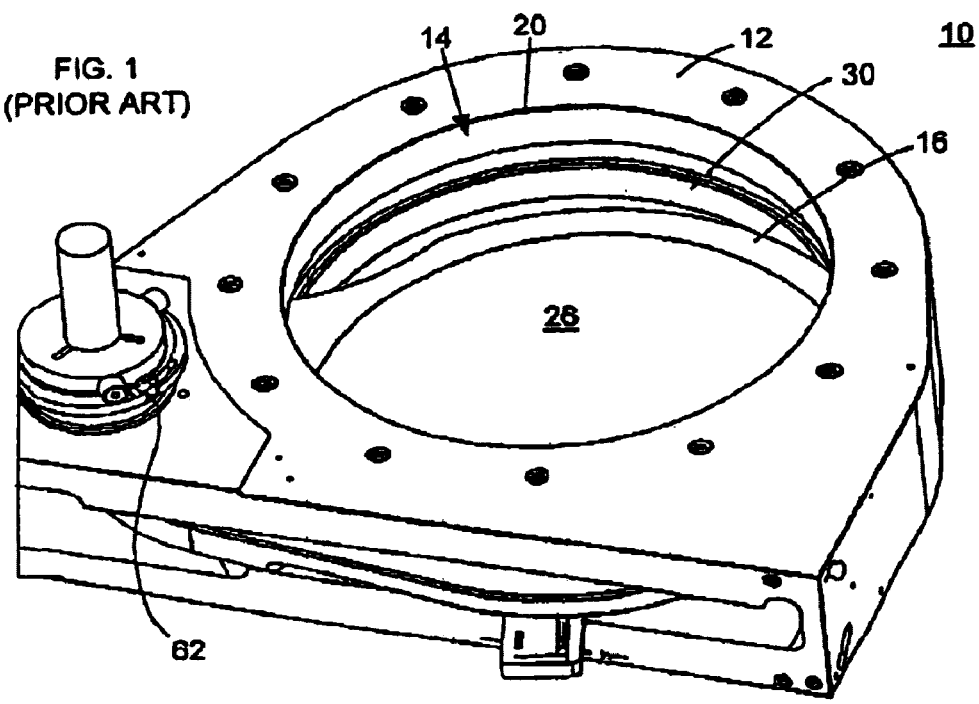
FIG. 1 is a bottom perspective view of a portion of an exemplary embodiment of a valve assembly constructed in accordance with the prior art, showing a slide plate and a seal ring of the valve assembly.
Figure 3:
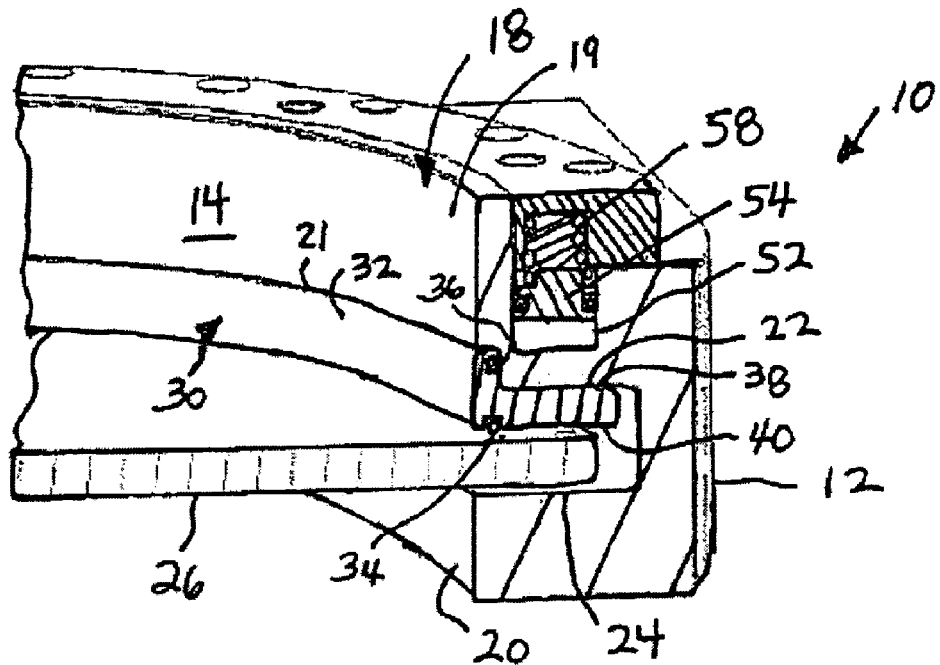
FIG. 3 is a perspective view, in section, of a portion of the valve assembly of FIG. 1, showing the slide plate of the valve assembly in a partially opened position spaced from a valve seat of an outlet of the valve assembly, with the seal ring biased away from the slide plate.
Figure 4:
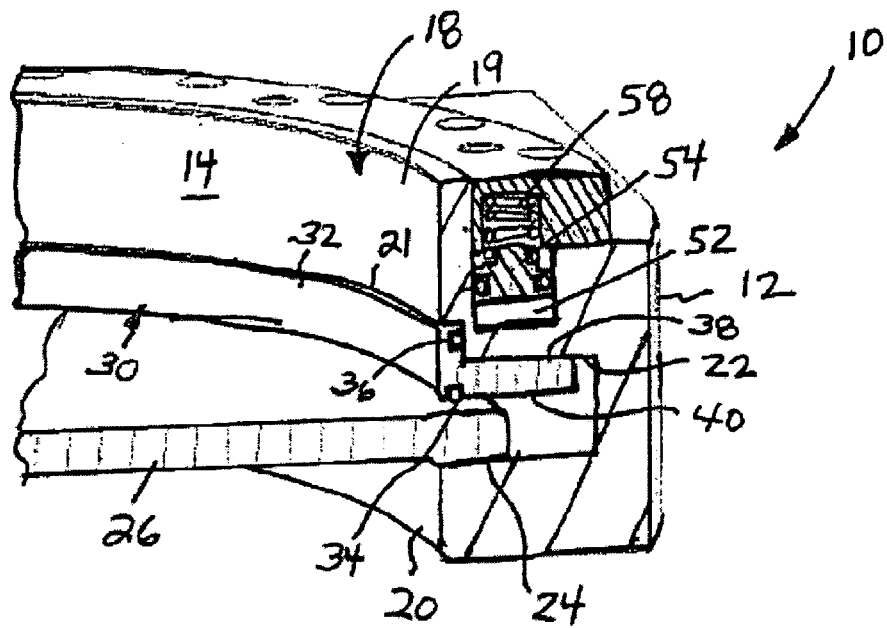
FIG. 4 is a perspective view, in section, of a portion of the valve assembly of FIG. 1, showing the slide plate in a closed position against the valve seat of the outlet of the valve assembly, with the seal ring biased away from the slide plate.

Referring to FIGS. 1, 3 and 4, an exemplary embodiment of a pendulum valve assembly 10 constructed in accordance with the prior art generally includes a housing 12 defining a flow path 14 extending between an inlet 18 and an outlet 20. First and second valve seats 22, 24, or annular surfaces, are provided in the flow pat 14 of the housing 12 round edges of the inlet 18 and the outlet 20, respectively. As shown, the assembly includes a pendulum valve 16 operatively mounted within the housing and having a slide plate 26 which is pivotally movable between a first opened position completely out of the flow path 14, and a second opened position, which is inside the flow path 14, as shown in FIG.

3. The slide plate 26 allows reduced fluid flow through the outlet 20 when in the second opened position inside the flow path 14. The slide plate 26 is further laterally, or axially, movable from the second opened position inside the flow path 14 to a minimum controllable conductance position against the second valve seat 24 of the outlet 20, as shown in FIG. 4, substantially preventing fluid flow through the outlet 20. In this soft closed position the plate 26 may or may not physically contact the second valve seat 24 of the outlet 20, and there maybe a small gap, which allows conductance.

Although not shown, the inlet 18 of the pendulum valve assembly 10 can, for example, be connected to a process chamber and the outlet 20 can be connected to a vacuum pump to form a portion of a high purity gas delivery system, such as those used in semiconductor manufacturing or other thin film coating processes performed at very low pressures (high vacuums), e.g., a pressure on the order of one torr or less. In general, a work piece, such a semiconductor wafer, is placed in the chamber, while a process gas is introduce into the chamber to chemically react with the work piece in a predetermined manner.

The pendulum valve assembly 10 helps control the conductance between the process chamber and the vacuum pump by controlling the position of the slide plate 26 between the first opened position, located completely out of the flow path 14, the second opened position, located inside the flow path 14, as shown in FIG. 3, and the minimum controllable conductance position against the valve seat 24 of the outlet 20, as shown in FIG. 4. The pendulum valve assembly 10 can thereby be used to control the pressure within the process chamber by controlling the conductance. It should be noted that the distance between the process chamber and the vacuum pump is preferably made as small as possible, such that, the pendulum valve assembly 10 is provided with a smallest dimension between the inlet 18 and the outlet 20 (i.e., "flange-to-flange dimension").

Referring also to FIG. 2, the valve assembly 10 further includes a seal ring 30, which coaxially surrounds the flow channel 14 and is positioned in the inlet 18 of the housing 12 and between the slide plate 26 and the valve seat 22 of the inlet 18. As shown best in FIGS. 3 and 4, the seal ring 30, has a first surface 38 facing towards the inlet 18, and a second surface 40 facing towards the outlet 20 and the slide plate 26, and a nipple 32 extending from the first surface 38 into the inlet 18. A shoulder 21 is provided between an inner surface 19 of the inlet 18 and the valve seat 22 of the inlet 18 for receiving the nipple 32. The seal ring 30 supports two o-rings 34, 36 formed of an elastomeric material and located in respective grooves formed in the seal ring 30. One o-ring 34 is positioned in a groove of the second surface, between the seal ring 30 and the slide plate 26, while the other o-ring 36 is positioned in a groove of the nipple 32, between the nipple 32 and the shoulder of the inlet 18.

Although not shown, the seal ring 30 has on the first surface 38 remote from the slide plate 26, a plurality of successive, circtunferentially arranged bores. The bores are aligned, respectively, with holes formed in the valve seat 22. The holes in the valve seat 22 extend to an annular chamber 52 which coaxially surrounds the flow channel 14. A plurality of fasteners, not shown, extend through the boles of the valve seat 22 and are secured in the corresponding bores of the seal ring 30. An annular piston 54 equipped with 0-rings is located in the channel 52 and is secured to the fasteners. The chamber 52 includes an inlet conduit so arranged relative to the piston 54 that the fluid, such as compressed air, flowing therethrough acts only on a first side of the piston 54 secured to the frsteners. There are further provided a plurality of springs 58 which act on an opposite side of the annular piston 54 remote from the fasteners (alternatively, two inlet conduits opening into the annular chamber 52 can be provided so that fluid pressure would act on opposite sides of the annular piston 54, to thereby eliminate the springs). An example of such an arrangement, including suitable fasteners, is described in greater detail in U.S. patent application Ser. No. 10/369,952, filed on Feb. 20, 2003, and entitled Seal Ring for Pendulum Valve Assembly, now U.S. Pat. No. 6,863,256, which is assigned to the assignee of the present invention and incorporated herein by reference. Another example of such an arrangement, including suitable fasteners, is described in U.S. Pat. No. 5,577,707 to Brida, which is entitled Slide Valve, and is incorporated herein by reference.

When the slide plate 26 is pivoted into the flow channel 14, but remains in an opened position as shown in FIG. 3, the seal ring 30 remains positioned against the valve seat 22. In this position of the seal ring 30, a pressure medium flows into the annular chamber 52 so that the annular piston 54 is displaced, against the biasing force of the springs 58 together with the seal ring 30. When the slide plate 26 is in its minimum controllable conductance, or "soft" closed, position against (or very near) the valve seat 24, as shown in FIG. 4, the seal ring 30 remains positioned against the valve seat 22. However, to completely seal the closed slide plate 26, the pressure fluid is evacuated from the annular chamber 52, so that the springs 58 can push the annular piston 54, together with the attached fasteners (not viewable) and the sealing ring 30 against the slide plate 26, which is forced against the valve seat 24 to provide a "hard" closed position. The closed slide plate 26 is completely sealed by the seal ring 30, for example, during cleaning of the process chamber when semiconductor processing is not being conducted.

When the slide plate 26 is pivoted into the flow channel 14, but remains in an opened position as shown in FIG. 3, the seal ring 30 remains positioned against the valve seat 22. In this position of the seal ring 30, a pressure medium flows into the annular chamber 52 so that the annular piston 54 is displaced, against the biasing force of the springs 58 together with the seal ring 30. When the slide plate 26 is in its minimum controllable conductance, or "soft" closed, position against (or very near) the valve seat 24, as shown in FIG. 4, the seal ring 30 remains positioned against the valve seat 22. However, to completely seal the closed slide plate 26, the pressure fluid is evacuated from the annular chamber 52, so that the springs 58 can push the annular piston 54, together with the attached fasteners 60 and the sealing ring 30 against the slide plate 30, which is forced against the valve seat 24 to provide a "hard" closed position. The closed slide plate 26 is completely sealed by the seal ring 30, for example, during cleaning of the process chamber when semiconductor processing is not being conducted.

The opening of the slide plate 26 is effected in reverse. Pressure fluid is supplied into the annular chamber 52 so that the annular piston 54 moves together with the fasteners away from the slide plate 26, moving the seal ring 30 away from the slide plate 26. Then, the slide plate 26 is simultaneously lifted and pivoted out of the flow channel 14.

As shown in FIG. 1, the assembly 10 can include a rotating cam mechanism 62 that precisely controls the rotational and longitudinal movement of the slide plate 26 between a completely opened position and a completely closed position. An example of a suitable rotating cam mechanism is shown in U.S. Pat. No. 6,089,537, which is assigned to the assignee of the present invention and has been incorporated herein by reference. The rotating cam mechanism beneficially provides fine conductance control near the closed position of the slide plate 26.

Figure 7:
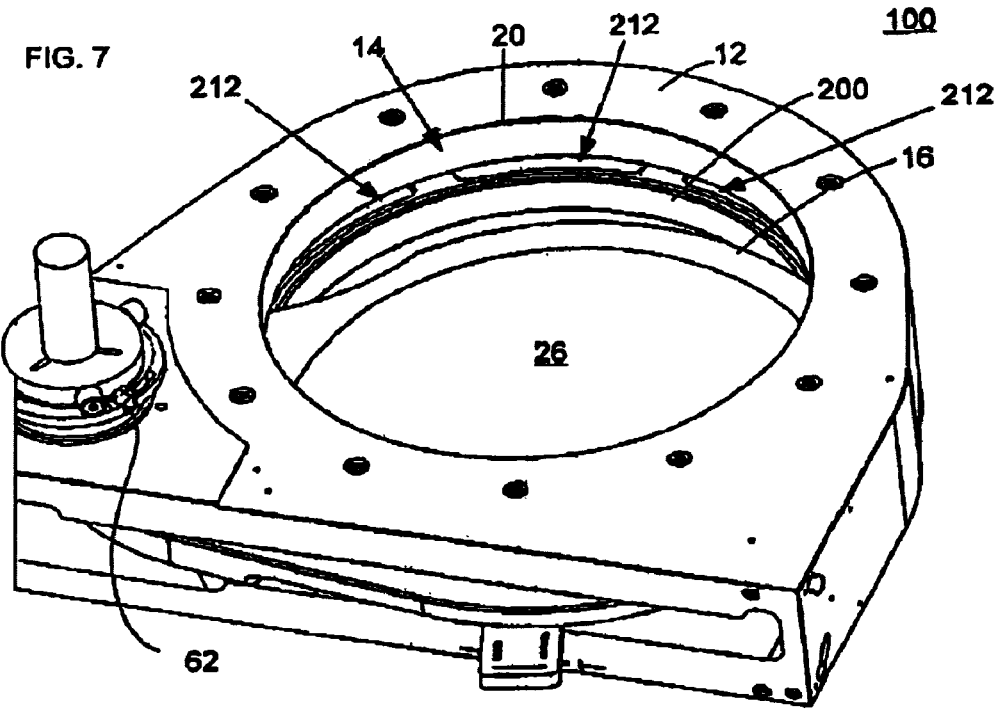
FIG. 7 is a bottom perspective view of a portion of an exemplary embodiment of a valve assembly constructed in accordance with the present invention, showing a slide plate and a seal ring of the valve assembly.
Figure 9:
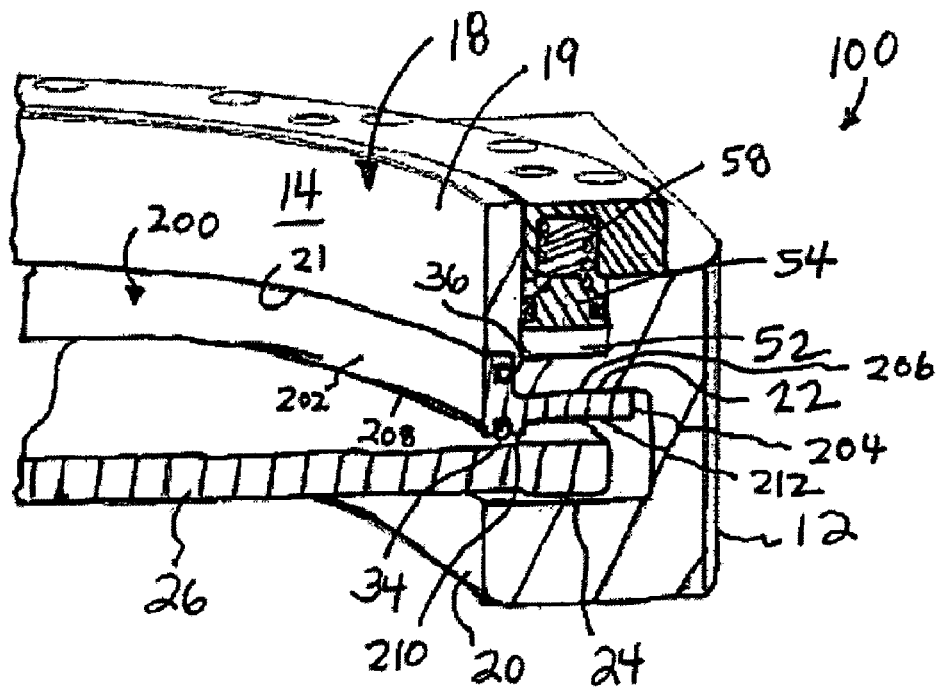
FIG. 9 is a perspective view, in section, of a portion of the valve assembly of FIG. 7, showing the slide plate of the valve assembly in a partially opened position spaced from a valve seat of an outlet of the valve assembly, with the seal ring biased away from the slide plate.
Figure 10:
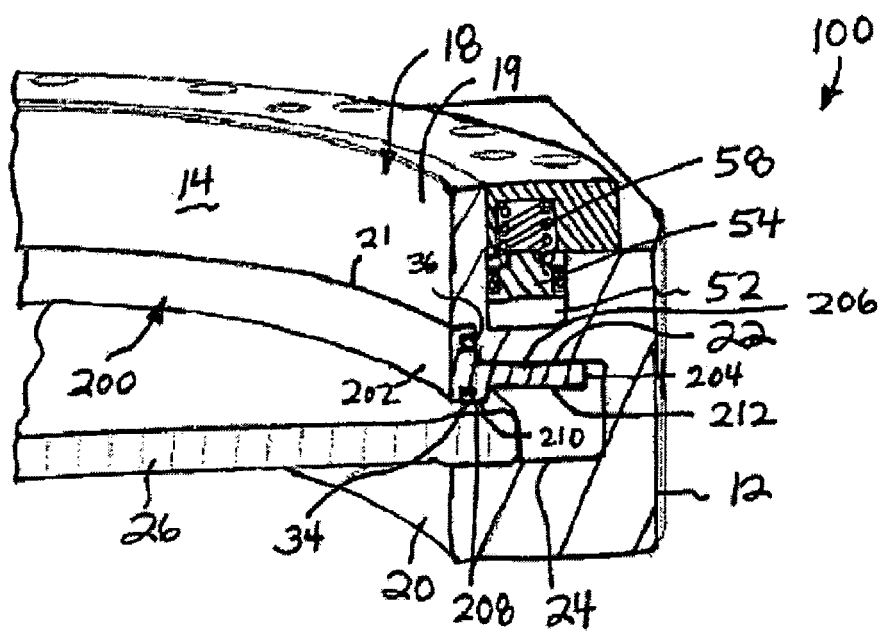
FIG. 10 is a perspective view, in section, of a portion of the valve assembly of FIG. 7, showing the slide plate in a closed position against the valve seat of the outlet of the valve assembly, with the seal ring biased away from the slide plate.
Figure 13:
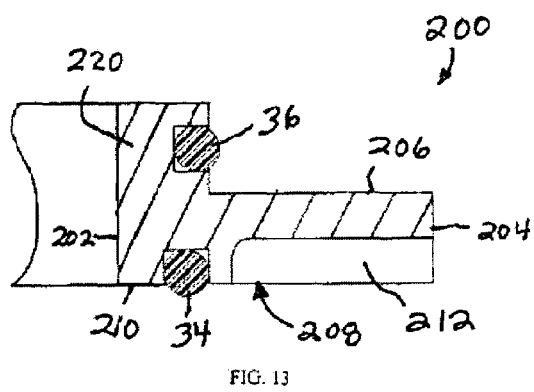
FIG. 13 is an enlarged sectional view of a portion of the seal ring of the pendulum valve assembly of FIG. 7.

A new and improved pendulum valve assembly 100 constructed in accordance with the present invention is shown in FIGS. 7, 9 and 10. The valve assembly 100 is similar to the valve assembly 10 of FIGS. 1, 3 and 4, such that similar elements have the same reference character. As also shown in FIGS. 8 and 13, however, the valve assembly 100 includes an exemplary embodiment of a new and improved seal ring 200 constructed in accordance with the present invention.

The seal ring 200 includes a first side 202 extending generally parallel with the axis of the flow path, a second side 204 spaced radially outwardly from the first side 202 and extending generally parallel with the axis of the flow path 14, a first surface 206 extending between the first and the second sides 202, 204 and facing towards the valve seat 22, and a second surface 208 axially spaced from the first surface 206 and extending between the first and the second sides 202, 204 and facing towards the slide plate 26. The second surface 208 includes a continuous annular sealing portion 210 for contacting the slide plate 26 when the seal ring 200 is biased against the slide plate 26, so that a fluid-tight seal can be formed between the continuous annular sealing portion 210 and the slide plate 26.

Referring to FIGS. 7–10 and 13, the seal ring 200 of the present invention is provided with at least one passageway 212 positioned between the annular sealing portion 210 and the second side 204. The passageway 212 is for allowing conductance between the seal ring 200 and the slide plate 26 prior to the annular sealing portion 210 contacting the slide plate 26, when the slide plate is moved towards the seal ring. The passageway 212 ensures that the conductance flow between the slide plate 26 and the valve seat 24 is smaller, and thus more controlling, than the conductance flow between the slide plate 26 and the seal ring 200 regardless of how closely the slide plate 26 is positioned to the seal ring 200, before an actual seal is created between the slide plate 26 and the seal ring 200. (It should be noted that a distance between a radially outer surface of the slide plate 26 and a radially inwardly facing surface of the passageway 212 is made greater than the distance between the slide plate 26 and the valve seat 24, such that the conductance flow between the slide plate 26 and the valve seat 24 is smaller.)

As shown best in FIG. 8, the second surface 206 of the exemplary embodiment of the seal ring 200 includes a plurality of the passageways 212 positioned between the annular sealing portion 210 and the second side 204 for allowing conductance between the seal ring 200 and the slide plate 26 prior to the slide plate 26 contacting the annular sealing portion 210. The passageways 212 are of equal size and are successively spaced in an annular pattern about the second surface 208 of the seal ring 200. The passageways 212 are preferably positioned between portions of the seal ring 200 that secure to the fasteners of the annular piston 54, such that the attachment points of the seal ring remain strong. Alternatively, however, the seal ring 200 could include a single passageway extending continuously around the ring between the annular sealing portion 210 and the second side 204, or a plurality of spaced-apart passageways of different sizes or shapes.

Figure 16:
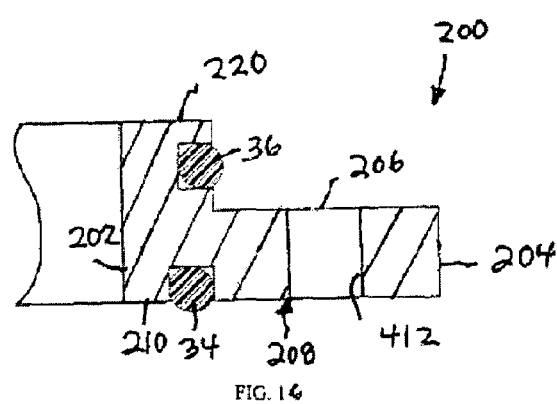
FIG. 16 is an enlarged sectional view of a portion of a further exemplary embodiment of a seal ring constructed in accordance with the present invention for use with the pendulum valve assembly of FIG. 7.
Figure 15:
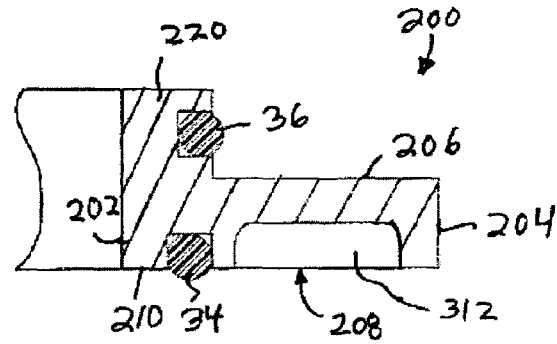
FIG. 15 is an enlarged sectional view of a portion of an additional exemplary embodiment of a seal ring constructed in accordance with the present invention for use with the pendulum valve assembly of FIG. 7.
Figure 17:
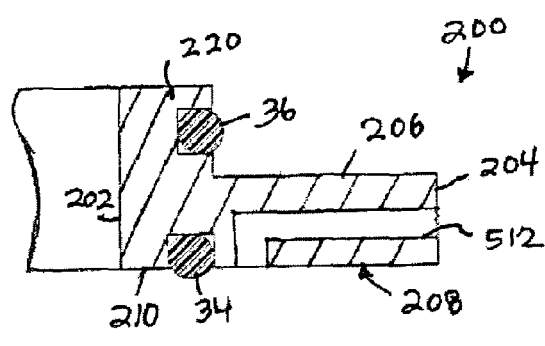
FIG. 17 is an enlarged sectional view of a portion of still another exemplary embodiment of a seal ring constructed in accordance with the present invention for use with the pendulum valve assembly of FIG. 7.

In the exemplary embodiment shown in FIGS. 7–10 and 13, the passageways comprise depressions 212 in the second surface 208 of the seal ring 200 that extend fully to the second side 204 of the seal ring. The passageways, however, can take other forms. For example, in the embodiment of FIG. 15, the passageways comprise depressions 312 in the second surface 208 of the seal ring 200 that are positioned between the annular sealing portion of the second surface and the second side of the seal ring, i.e., the depressions do not extend fully to the second side 204 of the seal ring. In the embodiment of FIG. 16, the passageways 412 are enclosed, i.e., form conduits as opposed to surface depressions or grooves, and extend between the second surface 208 of the seal ring 200 and the first surface 206 of the seal ring. In the embodiment of FIG. 17, the passageways 512 are enclosed, i.e., form conduits, and extend between the second surface 208 of the seal ring 200 and the second side 204 of the seal ring.

Figure 14:
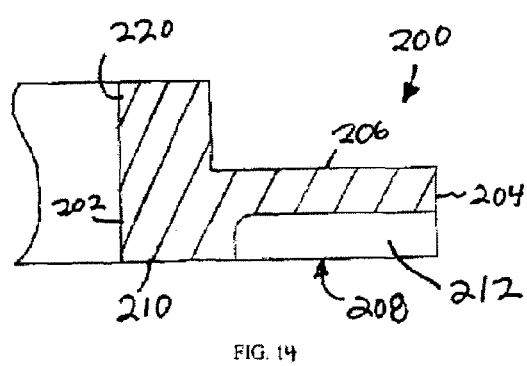
FIG. 14 is an enlarged sectional view of a portion of another exemplary embodiment of a seal ring constructed in accordance with the present invention for use with the pendulum valve assembly of FIG. 7.

In the exemplary embodiment shown, the seal ring 200 also includes a nipple 220 extending from the first surface 206, an o-ring 34 positioned in a groove of the annular sealing portion 210 of the second surface 208, and an o-ring 36 positioned in a groove of the nipple 220. It should be understood, however, that the seal ring 200 can be provided without o-rings, as illustrated by the embodiment shown in FIG. 14. The o-rings can instead be placed in a groove in the housing 12 of the valve assembly 100 and a groove in the slide plate 26.

Figure 5:
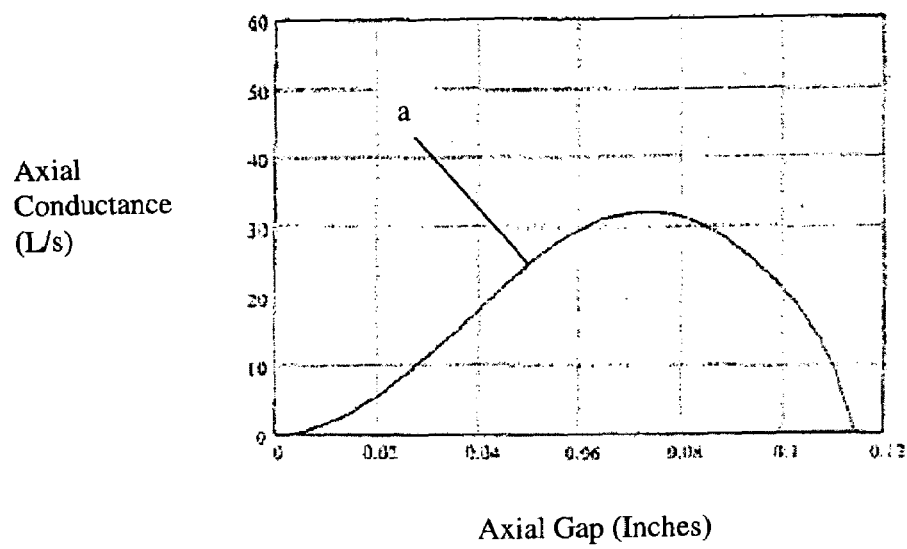
FIG. 5 is a graph of axial conductance through the valve assembly of FIG. 1 versus axial distance ("axial gap") between the slide plate and the valve seat of the outlet of the valve assembly of FIG. 1.
Figure 11:
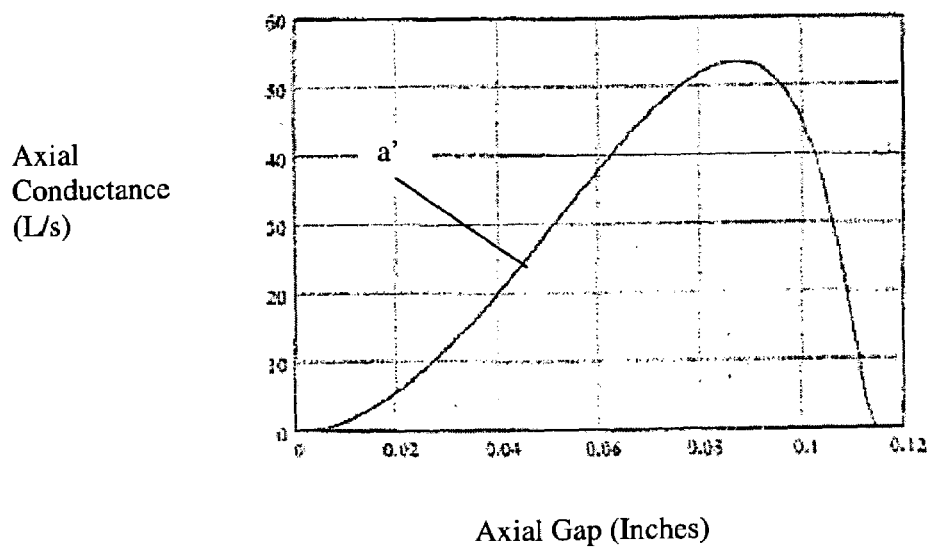
FIG. 11 is a graph of axial conductance through the valve assembly of FIG. 7 versus axial distance ("axial gap") between the slide plate and the valve seat of the outlet of the valve assembly of FIG. 7.

FIG. 5 is a graph of axial conductance through the valve assembly 10 of FIG. 1 versus distance ("axial gap") between the slide plate 26 and the valve seat 24 of the valve assembly 10 of FIG. 1 showing curve a, while FIG. 11 is a graph of axial conductance through the valve assembly 100 of FIG. 7 versus distance ("axial gap") between the slide plate 26 and the valve seat 24 of the valve assembly of FIG. 7 showing curve a'. The graphs illustrate that the valve assembly 100 of FIG. 7 provides greater axial conductance than the valve assembly 10 of FIG. 1 as the valve assemblies are initially opened.

Figure 6:
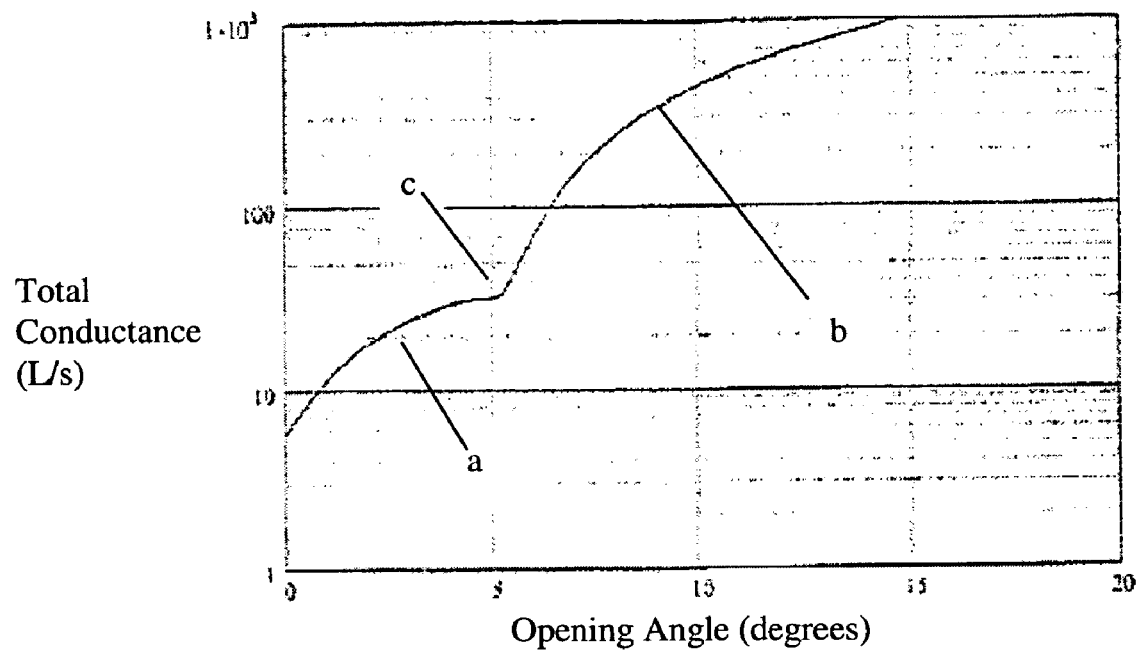
FIG. 6 is a graph of total conductance through the valve assembly of FIG. 1 versus the pivotal position or angle of the slide plate of the valve assembly of FIG. 1.
Figure 12:
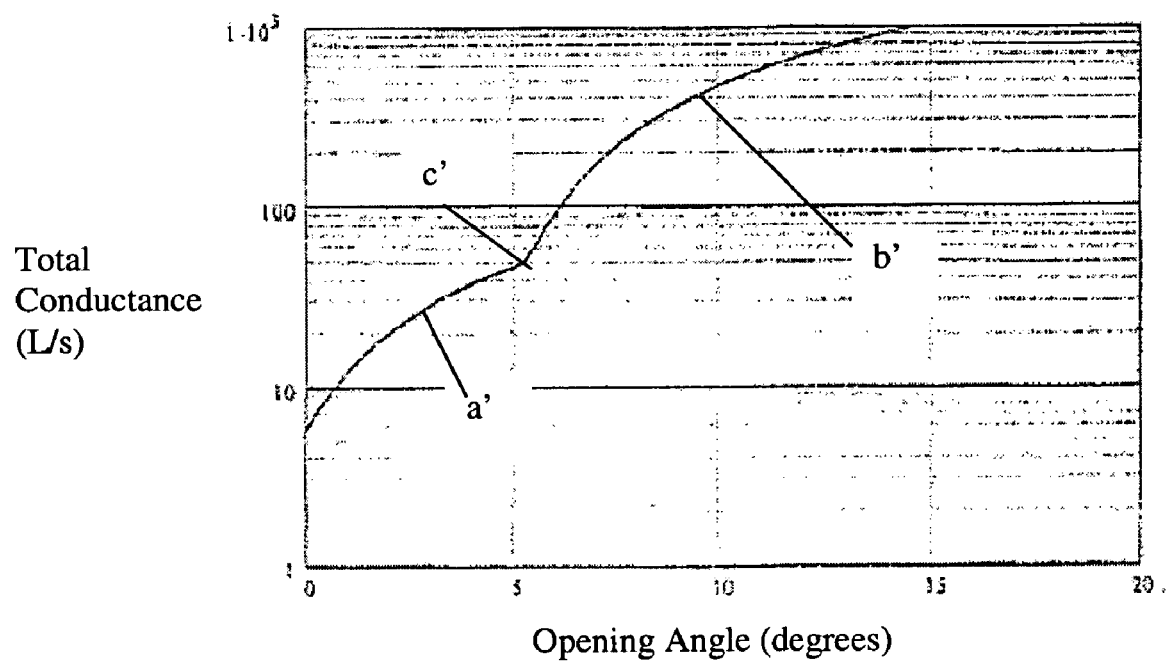
FIG. 12 is a graph of total conductance through the valve assembly of FIG. 7 versus the pivotal position or angle of the slide plate of the valve assembly of FIG. 7.

FIG. 6 is a graph of total conductance through the valve assembly 10 of FIG. 1 versus the pivotal position of the slide plate 26 of the valve assembly 10 of FIG. 1, showing curve a and further showing curve b joined to curve a at transition point c. FIG. 12 is a graph of total conductance through the valve assembly 100 of FIG. 7 versus the pivotal position of the slide plate 26 of the valve assembly 100 of FIG. 7, showing curve a' and further showing curve b' joined to curve a' at transition point c'. The graphs illustrate that the valve assembly 100 of FIG. 7 provides a smoother, less defined transition c' between the curves a' and b', which is beneficially especially in a closed loop system.

Thus, a new and improved pendulum valve assembly 100 constructed in accordance with the present invention has been described. The exemplary embodiments described in this specification have been presented by way of illustration rather than limitation, and various modifications, combinations and substitutions may be effected by those skilled in the art without departure either in spirit or scope from this invention in its broader aspects and as set forth in the appended claims. For example, the invention is not limited to pendulum-type slide valves, and is also applicable to a linear displaceable slide plate or gate valve.

In addition, the passageways 212 shown in the seal ring 200 could also, or alternatively, be placed in the slide plate 26 or in the valve seat 22. For example, a surface of the slide plate 26 facing the seal ring 200 can be provided with at least one passageway for increasing conductance between the seal ring and the slide plate during movement of the slide plate. If the valve assembly is provided without the seal ring, then one of the slide plate 26 and the annular surface 22 of the housing can be provided with at least one passageway for increasing conductance between the slide plate 26 and the annular surface 22 during movement of the slide plate.

The valve assembly 100 of the present invention as disclosed herein, and all elements thereof, are contained within the scope of at least one of the following claims. No elements of the presently disclosed valve assembly are meant to be disclaimed.

What is claimed is:

1. A valve assembly comprising:
    a housing having a flow channel and an annular surface surrounding the flow channel so as to define an axis of the flow channel;
    a slide plate located in the housing and movable (a) transversely to the axis of the flow channel between an open position, wherein the slide plate allows flow through the flow channel and does not block the cross section of the flow channel along the axis of the flow channel, and a soft closed position, wherein the slide plate is located within the cross section of the flow channel, and (b) axially along the axis of the flow channel from the soft closed position to a hard closed position, wherein the flow through the flow channel is blocked; and
    a seal ring positioned between the annular surface of the housing and the slide plate, wherein the seal ring includes a first side extending generally parallel with the axis of the flow path, a second side spaced radially outwardly from the first side and extending generally parallel with the axis of the flow path, a first surface extending between the first and the second sides and facing towards the annular surface of the housing, and a second surface axially spaced from the first surface and extending between the first and the second sides and facing towards the slide plate, wherein the second surface includes a continuous annular sealing portion for contacting the slide plate when the seal ring is positioned against the slide plate when the slide plate is located in the hard closed position, so that a fluid-tight seal can be formed between the continuous annular sealing portion and the slide plate when the slide plate is in the hard closed position, and at least one unobstructed passageway is positioned between the annular sealing portion and the second side of the seal ring for increasing fluid flow through the flow channel between the seal ring and the slide plate as the slide plate moves between the soft closed position and the hard closed position.

2. A valve assembly according to claim 1, wherein the passageways are of equal size and are successively spaced in an annular pattern about the seal ring.

3. A valve assembly according to claim 1, wherein the passageways of the seal ring extend between the second surface of the seal ring and the second side of the seal ring.

4. A valve assembly according to claim 3, wherein the passageways of the seal ring each comprise a depression in the second surface of the seal ring that extends to the second side of the seal ring.

5. A valve assembly according to claim 1, wherein the passageways of the seal ring each comprise a depression in the second surface of the seal ring positioned between the second side of the seal ring and the annular sealing portion of the second surface of the seal ring.

6. A valve assembly according to claim 1, wherein the passageways of the seal ring each extend between the second surface of the seal ring and the first surface of the seal ring.

7. A valve assembly according to claim 1, wherein the seal ring has a nipple extending coaxially into the flow channel.

8. A valve assembly according to claim 7, wherein the nipple has an annular groove in an outer surface of the nipple, and an o-ring is located in the groove.

9. A valve assembly according to claim 1, wherein the annular sealing portion of the second surface of the seal ring has an annular groove, and an o-ring is located in the groove.

10. A valve assembly according to claim 1, further comprising a shaft fixedly coupled to the slide plate trough a pivot arm extending generally laterally from the shaft, the shaft at least partially mounted within the housing to rotate about a longitudinal axis of the shaft to allow the slide plate to rotate from the open position into the flow channel to the soft closed position, and also slide substantially parallel to the axis of the flow channel to allow the slide plate to move axially between the soft closed position and the hard closed position.

11. A valve assembly according to claim 10, further including a cam mechanism coupled between the shaft and the housing to provide a combination of rotational movement and sliding movement of the shaft.

12. A valve assembly according to claim 11, wherein the cam mechanism comprises:
    a cam surface defined by the housing; and
    a cam follower fixed to the shalt and engaging the cam surface of the housing.

13. A valve assembly according to claim 1, further comprising a plurality of fasteners displaceably arranged in a plurality of holes of the annular surface of the housing and wherein the slide plate is secured to the fasteners.

14. A valve assembly according to claim 13, wherein the slide plate is removably secured to the fasteners.

15. A valve assembly according to claim 13, wherein the housing further includes an annular chamber which coaxially surrounds the flow passage and into which the holes formed in the annular surface open, and wherein the valve assembly further comprises an annular piston located in the annular chamber and connected to the fasteners.

16. A valve assembly according to claim 15, wherein the housing further includes at least one conduit in fluid communication with the annular chamber.

17. A valve assembly according to claim 15, further comprising a plurality of springs contained within the chamber and biasing the piston towards the seal ring.

18. A high purity gas delivery system including a valve assembly according to claim 1, and further including a process chamber connected to a vacuum pump through the valve assembly.

19. A valve assembly according to claim 1, wherein the passageway is provided in the seal ring.

20. A valve assembly according to claim 19, wherein the seal ring includes a plurality of the passageways.

21. A valve assembly according to claim 1, wherein the at least one passageway is provided in the slide plate.

22. A valve assembly according to claim 21, wherein the slide plate includes a plurality of the passageways.

* * * * *